United States Patent [19]

Trikilis

[11] Patent Number: 4,538,833

[45] Date of Patent: Sep. 3, 1985

[54] PUBLICATION

[75] Inventor: Theodore N. Trikilis, Medina, Ohio

[73] Assignee: P I E International Inc., Chippewa Lake, Ohio

[21] Appl. No.: 559,487

[22] Filed: Dec. 8, 1983

[51] Int. Cl.³ ............................................. B42D 1/00
[52] U.S. Cl. ........................................ 281/2; 281/5; 281/15 R; 283/61; 283/62; 283/63 R
[58] Field of Search .................... 229/68 R, 72; 281/2, 281/3 R, 5, 15 R, 43, 1 R; 283/61, 62, 63 R

[56] References Cited

U.S. PATENT DOCUMENTS

| | | | |
|---|---|---|---|
| 951,482 | 3/1910 | Marshall | 281/43 X |
| 1,363,081 | 12/1920 | Brown | 281/62 |
| 2,118,964 | 5/1938 | Bonnaire | 281/5 |
| 3,738,686 | 6/1973 | Morse | 283/63 R |

FOREIGN PATENT DOCUMENTS

| | | | |
|---|---|---|---|
| 1946932 | 4/1971 | Fed. Rep. of Germany | 281/15 R |
| 2367620 | 5/1978 | France | 281/2 |

*Primary Examiner*—Paul A. Bell
*Attorney, Agent, or Firm*—Yount & Tarolli

[57] ABSTRACT

A publication, capable of being read in a manner similar to a magazine, is formed of a single rectangular sheet of material. A plurality of creases in the sheet of material cooperate to define first and second series of panels. The sheet is folded along a longitudinal crease so that the two series of panels face in opposite directions. The sheet is then folded along transverse creases to form a series of accordion of zig-zag folds. When publication is in a closed condition, it can be opened by turning the top panel in the same manner as in which the cover of a magazine is turned to open the magazine. The panels on the viewer's right are then sequentially turned to sequentially expose pairs of panels until the panels are again stacked with the panel which was originally on the bottom of the stack disposed at the top of the stack. The stack is then openable from the closed condition in the same manner as which a magazine is opened. A poster or additional indicia may be on the back sides of the panels.

4 Claims, 18 Drawing Figures

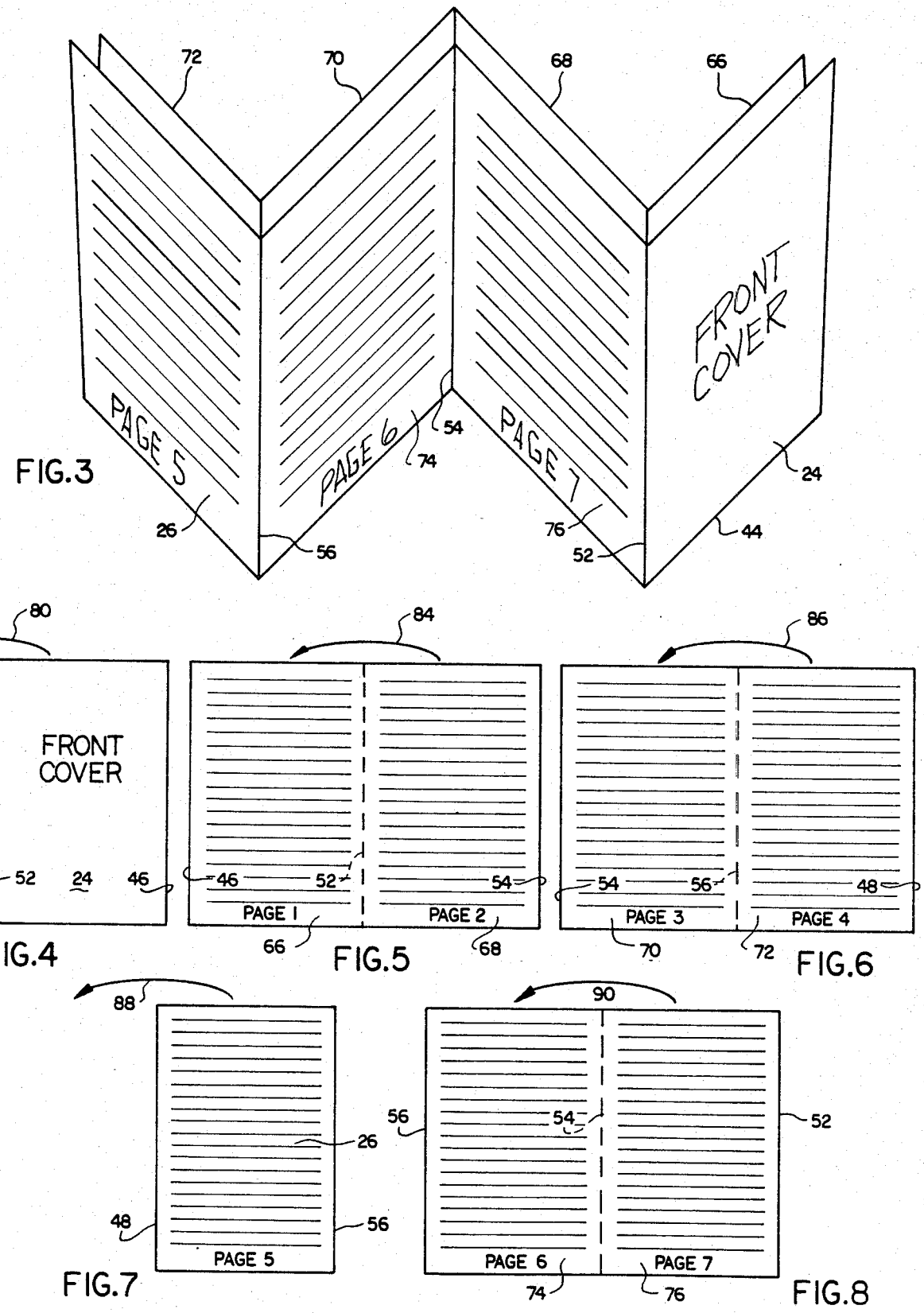

PUBLICATION

BACKGROUND OF THE INVENTION

The present invention relates to a publication which and is formed from a single sheet of material and is capable of being read in a manner similar to a magazine.

A book having a plurality of leaves which are interconnected in an accordion or zig-zag fold is disclosed in U.S. Pat. No. 3,738,786. The leaves can be turned about center creases in the same manner as the pages of a book. The leaves can also be pulled out to form a panoramic illustration. However, the amount of material which can be printed on the leaves is limited since the back of the leaves are not mounted for viewing. In addition, the printed material on the leaves is disposed on the same side of the leaves as the panoramic illustration.

SUMMARY OF THE PRESENT INVENTION

The present invention provides a publication which is formed from a single sheet of material and is capable of being read in a manner similar to a magazine. In one embodiment of the invention, a poster or other illustration is provided on the back of panels having front sides with indicia which is read when the panels are turned. In another embodiment of the invention, additional indicia is printed on the back of the panels so that the single sheet of material can be refolded and the additional indicia read.

Accordingly, it is an object of this invention to provide a new and improved publication which is formed from a single sheet of material and is divided into panels upon which indicia is disposed, the panels being capable of being turned in the same manner as in which the pages in a magazine are turned to enable the indicia to be read.

BRIEF DESCRIPTION OF THE DRAWINGS

The foregoing and other objects and features of the present will become more apparent upon a consideration of the following description taken in connection with the accompanying drawings wherein:

FIG. 3 is an illustration, taken generally along the line 3—3 of FIG. 2, illustrating indicia on the front sides of a second series of panels;

FIG. 4 is a top plan view of the publication of FIGS. 1-3 in the closed condition;

FIG. 5 is a top plan view of the publication of FIG. 4 in an open condition exposing indicia on a pair of panels;

FIG. 6 is a top plan view, generally similar to FIG. 5, after the panels have been turned about a center crease in the same manner as in which the pages of a magazine are turned;

FIG. 7 is a top plan view of the closed publication with the upper panel in the stack of panels being the panel which was the bottom panel when the publication was in the closed condition of FIG. 4;

FIG. 8 is a top plan view, generally similar to FIG. 5, of the publication after it has been opened from the closed condition shown in FIG. 7;

DESCRIPTION OF SPECIFIC PREFERRED EMBODIMENTS OF THE INVENTION

General Description

Figure 1:
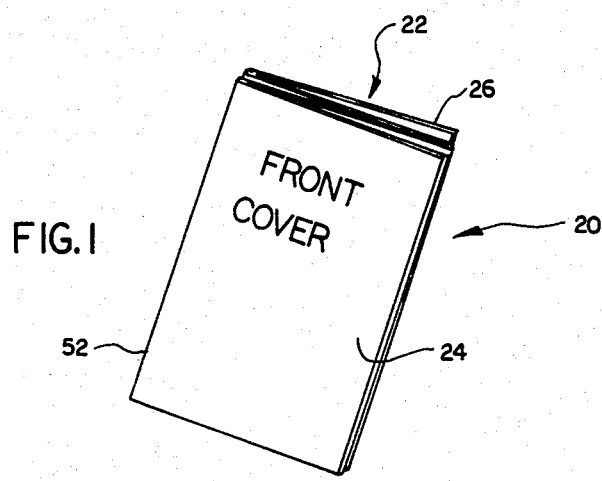
FIG. 1 is an illustration of a publication constructed in accordance with the present invention, the publication being shown in a closed condition.

A publication 20 constructed in accordance with the present invention is illustrated in a closed condition in FIG. 1. When the publication 20 is in the closed condition, a series of panels are disposed in a stack 22 having a front cover or top panel 24. The publication 20 is read by turning the panels in the same manner as in which the pages of a magazine are turned.

When the publication 20 is to be read, the top panel 24 is turned in the same manner as in which the cover of a magazine is turned. The panels of the open publication are then turned in the same manner as in which the pages of a magazine are turned until the publication is again closed with what was previously a bottom panel 26 (FIG. 1) at the top of the stack 22 of panels (FIG. 7). In accordance with a feature of the present invention, the publication 20 can continue to be read by merely continuing to turn the panels of the stack of panels until the cover panel 24 is again at the top of the stack of panels.

Figure 9:
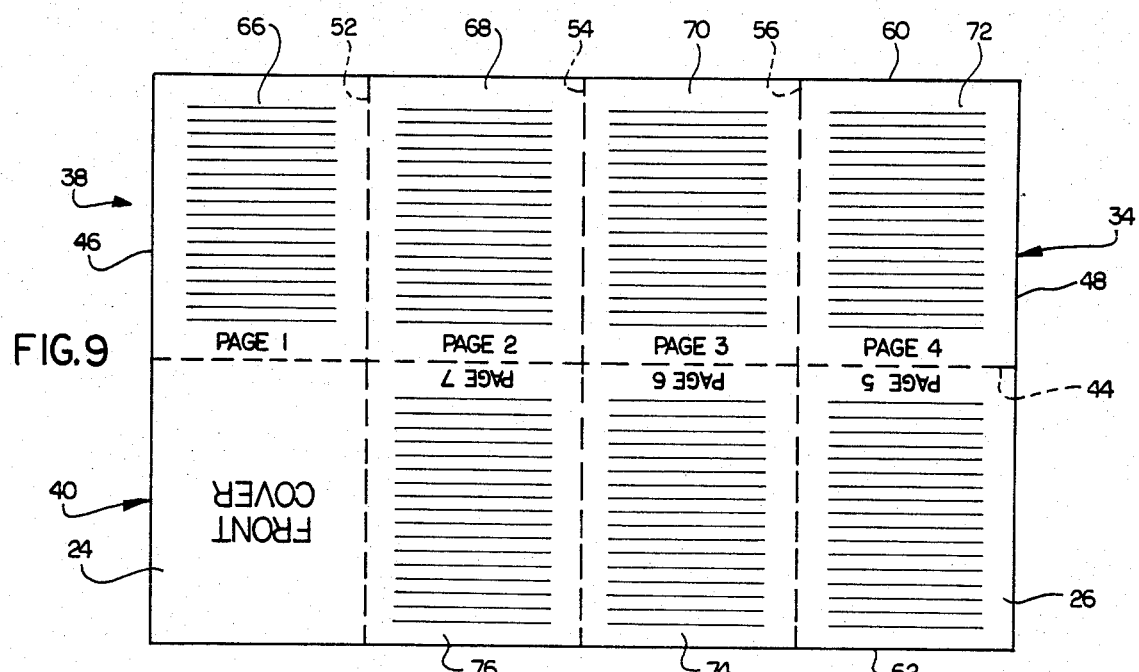
FIG. 9 is a top plan view of a single sheet from which the publication of FIGS. 1-8 is formed, the front sides of the panels being exposed.
Figure 10:
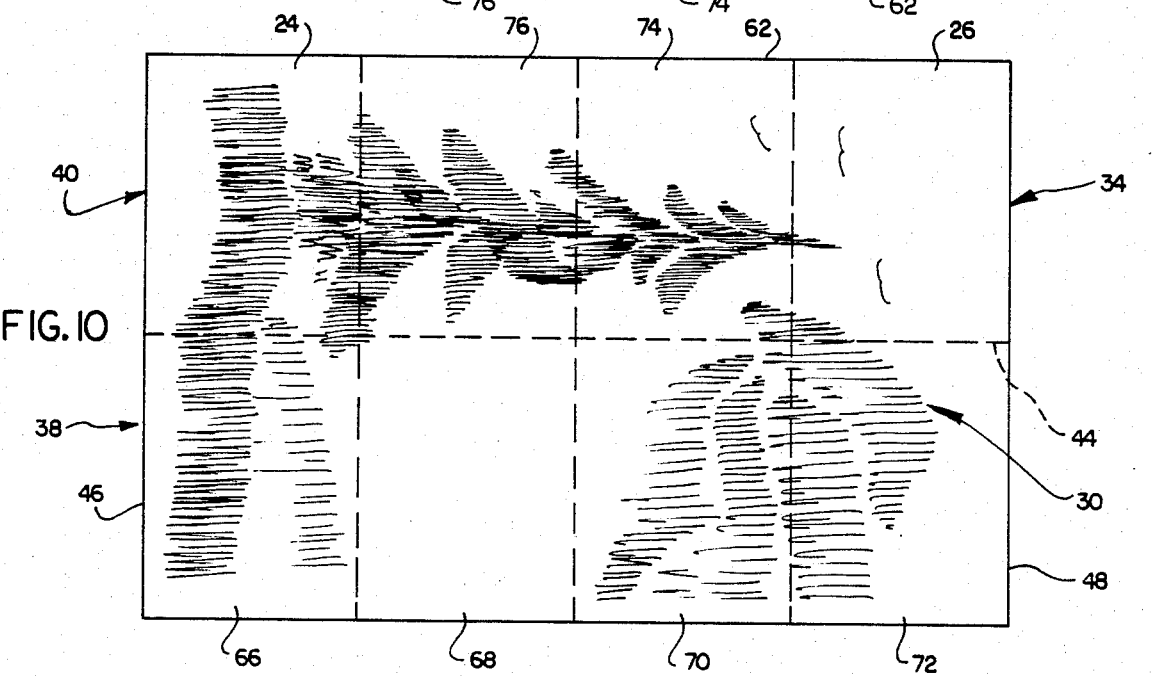
FIG. 10 is a bottom plan view of the sheet of FIG. 9 and illustrating a poster formed on the back sides of the panels.

In accordance with another feature of the embodiment of the invention illustrated in FIGS. 2-10, the back sides of the panels, that is the sides of the panels which are not read when turning the panels in the manner in which the pages of a magazine are turned, cooperate to form a poster 30 (see FIG. 10). The poster 30 consists of an illustration which extends across the backs of each of the panels. In order to view the poster 30, the accordion folded panels are opened and the sheet 34 from which the publication 20 is formed is flattened in the manner shown in FIG. 10. Thus, in the embodiment of the invention shown in FIGS. 1–10, the publication 20 has a number of panels which are read in the same manner as the pages of a magazine and a large poster 30 which extends across the backs of the panels.

It is contemplated that under certain circumstances, it may be desirable to omit the poster 30 and continue with printed material on the back sides of the panels. Thus, in the embodiment of the invention shown in FIGS. 12–16, the backs of the panels are printed with indicia, in much the same manner as in which the fronts of the panels in the embodiment of the invention shown in FIGS. 1–10 were printed with indicia. By refolding the single sheet of material from which the publication is formed, the material on the back of the panels can be read by turning the panels in the same manner as in which the pages of a magazine are turned, that is in the same manner as in which the material on the front of the panels was read.

In the embodiments of the invention shown in FIGS. 1–16, the publication is formed with an even number of panels along the longitudinally extending edges of the sheets of material from which the publications are formed. It is contemplated that it may be desirable to make the publication with an uneven number of panels along each of the longitudinally extending edges of the single sheet of material from which the publication is formed. When an even number of panels is disposed along the longitudinally extending edges of the sheet, the front cover panel and the back panel of the closed publication are disposed along the same longitudinal edge of the single sheet of material. When an uneven number of panels is disposed alon each longitudinal edge of the single sheet of material (FIG. 17), the front cover panel is disposed along on longitudinally extending edge of the sheet while the rear or bottom panel is disposed along the opposite longitudinally extending edge of the sheet. It is contemplated that the publication 20 could be formed with three or more series of panels. Thus, a first series of panels could be formed along one longitudinally extending edge of a sheet of material, a second series of panels could be formed along the opposite longitudinally extending edge of the sheet of material, and additional series of panel could be formed in the central portion of the sheet of material. Of course, such an embodiment of the invention would have a plurality of longitudinal creases.

EMBODIMENT OF FIGS. 1–11

The publication 20 is formed from the single sheet 34 of material (see FIG. 9). The single sheet 34 of material is divided into two series of rectangular panels, that is a first or front series of panels 38 and a second or rear series of panels 40. The front and rear series of panels 38 and 40 are separated from each other by a longitudinally extending crease 44. The crease 44 extends between and is perpendicular to transverse edges 46 and 48 of the rectangular sheet 34. After the single sheet 34 has been folded along the longitudinally extending center crease 44, the single sheet is folded along transverse creases 52, 54 and 56 in a zig-zag or accordion manner illustrated in FIG. 2.

The transverse creases 52, 54 and 56 cooperate with the longitudinally extending crease 44, transverse edges 46 and 48, and longitudinally extending edges 60 and 62 of the rectangular sheet 34 to define a plurality of rectangular panels (FIG. 9). Thus, the first or front series of panels 38 includes a series of page panels 66, 68, 70 and 72 having printed indicia or textual material on their front sides. The panels 66, 68, 70 and 72 form pages 1, 2, 3 and 4 of the publication 20. The second or rear series of panels 40 includes the front cover panel 24, the bottom or rear panel 26 which forms page 5 of the publication 20, and a pair of page panels 74 and 76 which form pages 6 and 7 of the publication 20.

When the sheet 34 is in the flat position shown in FIG. 9, the printed text on the panels 66–72 is right side up relative to a viewer, while the printed text on the second series 40 of panels is upside down relative to the viewer. By having the indicia on the front series 38 of panels offset by 180° from the indicia on the back series 40 of panels, the indicia on both series of panels will face in opposite directions after the sheet 34 has been folded about the longitudinal extending crease 44, in the manner shown in FIG. 2. Thus, when the longitudinally extending crease 44 is downward and the panels 66–72 are toward the viewer, the indicia on pages 1–4 is right side up and faces the viewer. Similarly, the indicia on the front cover panel 24, rear or page 5 panel 26 and page 6 and 7 panels 74 and 76 faces in the opposite direction and is right side up when viewed from the opposite direction.

When the flat sheet 34 has been folded about the longitudinal crease 44, the back sides of the panels 24, 26, 66, 68, 70, 72, 74 and 76 (FIG. 10) are juxtaposed, that is, the back sides of the panels are in a side-by-side relationship. The single sheet 34 is then folded along the transverse creases 52, 54 and 56 in an accordion or zig-zag fold manner shown in FIGS. 2 and 3. It should be noted that when the sheet 34 is folded along the transverse creases 52, 54 and 56, the upper portions (as viewed in FIG. 9) of the creases are folded in one direction and the lower portions of the creases are folded in an opposite direction. This results in the indicia on pages 1, 2, 3 and 4, that is on panels 66–72 being upright to a viewer when the sheet 34 is in the orientation shown in FIG. 2 with the longitudinal crease 44 downwardly in the panels facing toward the viewer. Similarly, when the indicia on the front cover, back cover or page 5, page 6, and page 7, that is on panels 24, 26, 74 and 76, is upright to a viewer when the crease 44 is disposed downwardly and the sheet 34 is in the orientation shown in FIG. 3.

Figure 2:
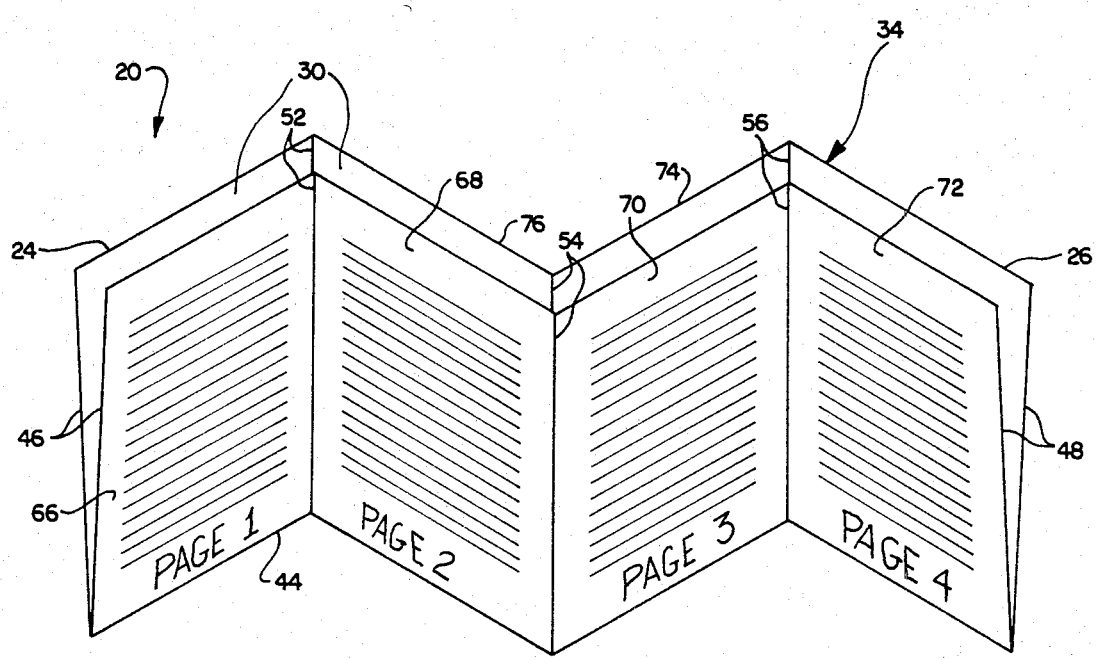
FIG. 2 is an illustration of the publication of FIG. 1 in an extended condition with indicia on the front sides of a first series of panels exposed.

The publication 20 may be moved from the extended condition shown in FIGS. 2 and 3 to the closed condition shown in FIGS. 1 and 4 by merely closing the accordion folds at the transverse creases 52, 54 and 56. This results in the cover panel 24 being exposed and the bottom panel 26 facing downwardly and forming the bottom of the stack 22 of panels. At this time, the front sides of the panels 66 and 68 are disposed in flat abutting engagement. The front sides of the panels 70 and 72 are disposed in flat abutting engagement. Similarly, the front sides of the panels 74 and 76 are disposed in flat abutting engagement. Of course, the rear sides of the panels 24, 26 and 66–76 are disposed in flat abutting engagement.

The closed publication is opened by pivoting or turning the front cover panel 24 (see FIG. 4) about the crease 52 in the manner indicated schematically by the arrow 80, that is in the same manner as in which the cover of a magazine is turned to open the magazine.

This results in the indicia on the first and second page panels 66, 68 being exposed in an upright orientation to a viewer on opposite sides of the crease 52 (FIG. 5). At this time, the transverse crease 54 will be to the viewer's right and the transverse edge 46 of the sheet will be to the viewer's left.

After the viewer has read the upright indicia on pages 1 and 2, the panel 68 is turned about the crease 52 in the same manner as in which the pages of a magazine are turned, that is in the manner indicated schematically by the arrow 84 in FIG. 5. This results in the indicia on pages 3 and 4, that is panels 70 and 72 (FIG. 6), being exposed in an upright orientation to the viewer on opposite sides of the transverse crease 56. At this time, the transverse crease 54 will be on the viewer's left and the transverse edge 48 of the sheet will be on the viewer's right.

After the indicia on the panels 70 and 72 has been read, the panel 72 is turned about the crease 56 in the same manner as in which the page of a magazine is turned, that is in the manner indicated schematically by the arrow 86 in FIG. 6. This results in the stack 22 of panels again being closed (FIG. 7) with the indicia on the panel 26, that is, page 5, exposed in an upright orientation to the viewer. At this time, the transverse edge 48 of the panel 26 is disposed on the viewer's left while the transverse crease 56 is on the viewer's right.

In accordance with a feature of the present invention, once the indicia on page 5 has been read by the viewer, the indicia on pages 6 and 7 can be exposed for reading by merely turning the back or cover panel 26 in the same manner as in which the front cover of a magazine is turned, that is in the manner indicated schematically by the arrow 88 in FIG. 7. Turning the back panel 26 results in the stack of panels being reopened to expose the indicia on the page panels 74 and 76 in an upright orientation on opposite sides of the crease 54 (see FIG. 8). At this time, the transverse crease 56 will be on the viewer's left and the transverse crease 52 will be on the viewer's right.

Once the indicia on the page panels 74 and 76 have been read, the panel 76 is turned in the same manner as the page of a magazine, that is in the manner indicated by the arrow 90 in FIG. 8. This results in the stack of panels again being closed with the cover panel 24 on top of the stack, in the manner shown in FIG. 4 and the panel 26 at the bottom of the stack.

During the reading of the text on the front sides of the panels 24, 26 and 66–76, the indicia forming the poster 30 on the back sides of the panels was not exposed to the viewer. Thus, when the panels of the closed publication are sequentially turned in the manner shown in FIGS. 4–8 to expose the indicia on pages 1–7, the back sides of the panels of the first or front series of panels 38 and the second or rear series 40 of panels remain in a side-by-side or juxtaposed relationship and cannot be viewed.

In order to view the poster 30, it is necessary to first extend the accordion folded publication by pulling along the two transverse edges 46 and 48 of the single sheet 34. This changes the publication from the closed condition of FIGS. 1 and 4 to the extended condition of FIGS. 2 and 3. Once the publication has been extended, it is unfolded or turned about the longitudinal crease 44 and flattened with the poster 30 facing upwardly (see FIG. 10). This enables a viewer to look at the material on the poster 30.

Although the poster has been shown as having an upper end adjacent to the transverse edge 48 of the sheet 30 and a lower end adjacent to the transverse edge 46 of the sheet, it is contemplated that the illustration forming the poster could be upright when the sheet 34 is in any desired orientation. Of course, while the poster 30 is being viewed, the front sides of the panels 24, 26 and 66–76 face away from the viewer. The poster 30 on the back of the panels 24, 26 and 66–76 and the text on the front of the panels could relate to any desired subject matter. However, in one specific instance, the poster 30 was a picture of an entertainer and the text related to the entertainer's accomplishments.

Figure 11:
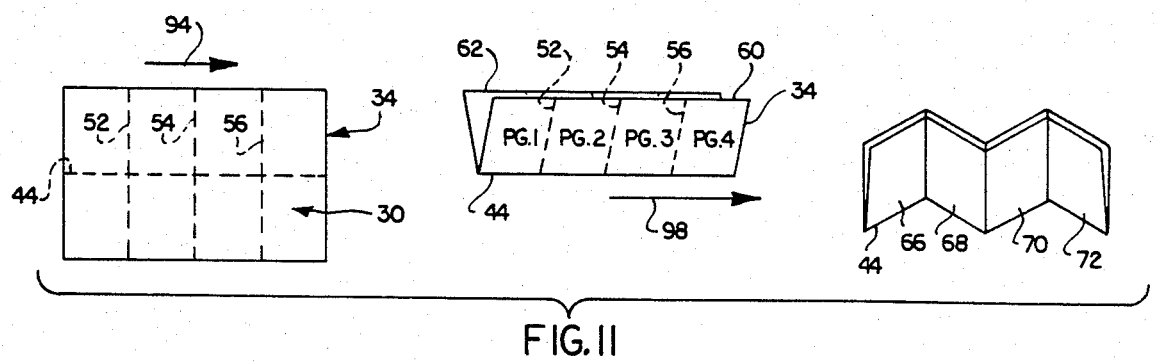
FIG. 11 is a schematic illustration depicting the manner in which the publication of FIG. 1 is formed by folding a single sheet of material.

The manner in which the publication 20 is fabricated is illustrated schematically in FIG. 11. Thus, a single sheet 34 of material is fed through a printing press in the direction indicated by the arrow 94. As the sheet 34 passes through the printing press, the poster 30 is printed on the top of the sheet and the indicia for the front cover and pages 1–7 is printed on the bottom (as viewed in FIG. 11) of the sheet. Once the single sheet 34 has been printed, it is folded along the longitudinally extending crease 44 in the manner indicated schematically in FIG. 11 by moving the sheet through a folder in the direction indicated by the arrow 98. As the sheet 34 continues to move through the folder, it is folded about the transverse creases 52, 54 and 56 with an accordion or zig-zag fold, as shown in the right of FIG. 11 and in FIGS. 2 and 3. This results in the formation of a publication which can be read in the same manner as a magazine and which can be opened to provide a relatively large poster 30.

SECOND EMBODIMENT

In the embodiment of the invention illustrated in FIGS. 1–11, a poster is printed on the back of the panels 24, 26 and 66–76. In the embodiment of the invention shown in FIGS. 12–16, the poster has been omitted and textual material has been printed on the back of the panels. Since the embodiment of the invention in FIGS. 12–16 is generally similar to the embodiment of the invention illustrated in FIGS. 1–11, similar numerals will be utilized to designate similar components, the suffix letter "a" being associated with the numerals of FIG. 12 in order to avoid confusion.

Figure 12:
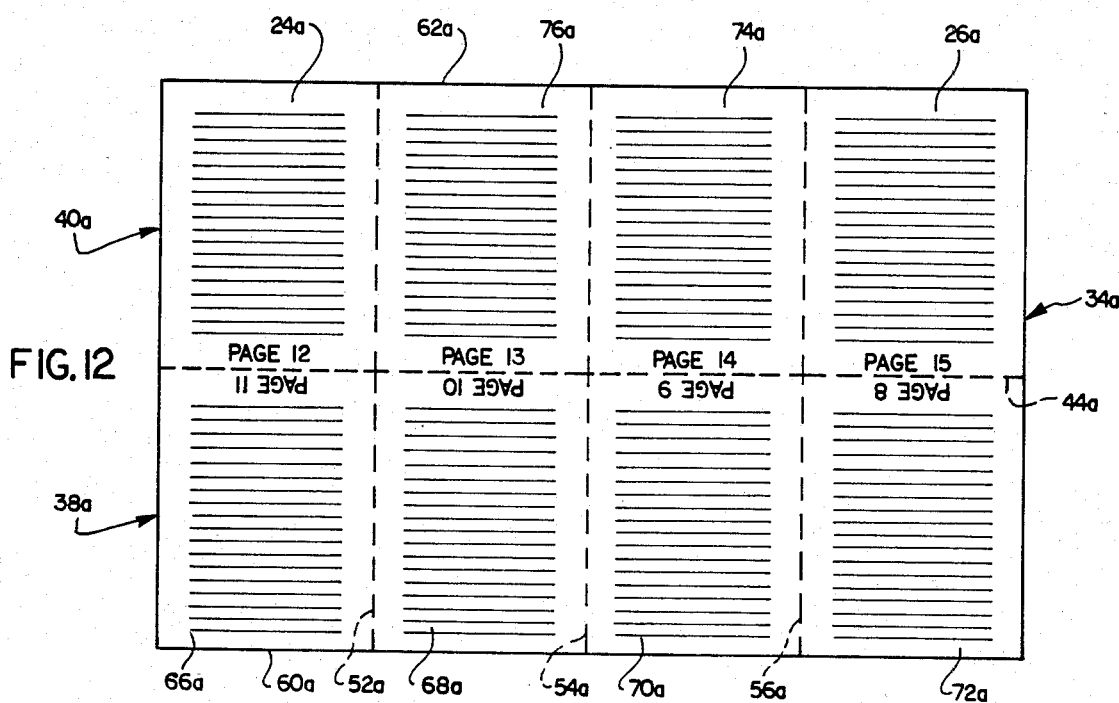
FIG. 12 is a bottom plan view, generally similar to FIG. 10, of an embodiment of the invention in which the poster is omitted and indicia is disposed on the back sides of the panels.
Figure 13:
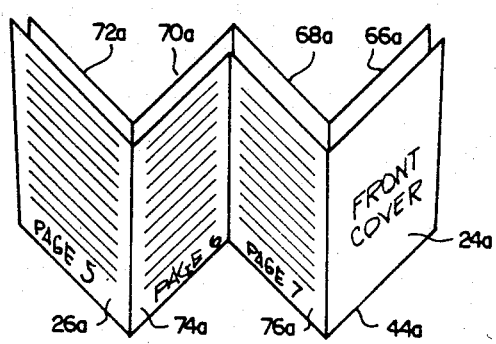
FIG. 13 is an illustration, generally similar to FIG. 3, illustrating the manner in which the single sheet of material of FIG. 12 is folded in an accordion or zig-zag fold.

In the embodiment of the invention shown in FIGS. 12–16, a publication, similar to the publication shown in FIG. 1, is formed using a single sheet of 34a of material (see FIG. 12). The rectangular sheet 34a is divided into a plurality of rectangular panels 24a, 26a, 66a, 68a, 70a, 72a, 74a and 76a. The rectangular panels 24a, 26a, and 66a–76a are arranged in a first or front series 38a of panels and a second or rear series 40a of panels. The panels 24a, 26a and 66a–76a are separated from each other by creases 44a, 52a, 54a and 56a.

The sheet 34a has been illustrated in FIG. 12 with the back sides of the panels 24a, 26a, and 66a–76a facing upwardly. The downwardly facing front sides of the panels 24a, 26a and 66a–76a are provided with textual indicia in the same manner as in which the front sides of the panels 24, 26 and 66–76 of FIG. 9 are provided with textual indicia. In addition, the back sides of the panels 24a, 26a and 66a–76a are provided with textual indicia. The textual indicia on the back sides of the panels 24a, 76a, 74a, and 26a form pages 12, 13, 14 and 15 (see FIG. 12). The indicia on the panels 72a, 70a, 68a and 66a forms pages 8, 9, 10 and 11.

The indicia for the upper (as viewed in FIG. 12) series 40a of panels is right side up relative to a viewer, while the indicia on the lower series of panels 38a is upside down relative to the viewer. Thus, the indicia on the first series of panels 38a has an orientation which is offset by 180° from the orientation of the indicia on the second set of panels 40a.

To form a publication, similar to the publication 20 of FIG. 1, the flat sheet 34a is folded along the longitudinally extending crease 44a. The sheet is then folded along transverse creases 52a, 54a and 56a to form an accordion or zig-zag fold in the manner illustrated in FIG. 13. The indicia on the front sides of the panels 24a, 26a and 66a–76a, can then be read by turning the panels in the same manner as described in conjunction with the embodiment of the invention shown in FIGS. 1–11.

Figure 14:
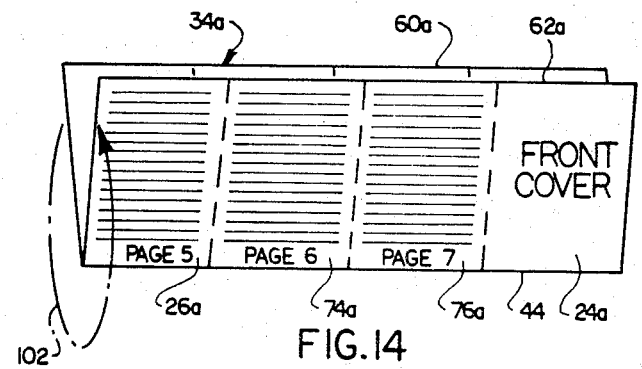
FIG. 14 is a view of the single sheet of FIG. 13 with the accordion folds straight prior to refolding of the single sheet of material to expose the indicia on the back sides of the panels.

When it is desired to read the indicia on the back of the panels 24a, 26a and 66a–6a, the accordion folds are straightened, in the manner illustrated in FIG. 14. The sheet 34a is then folded only about the longitudinally extending bottom crease 44a. At this time, the back sides of the panels 24a, 26a and 66a–76a are in a side-by-side relationship.

Figure 15:
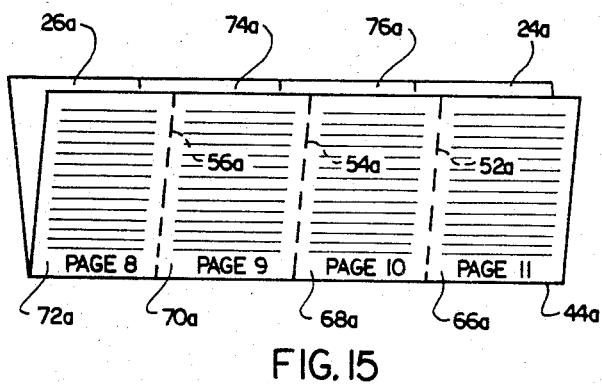
FIG. 15 is an illustration, generally similar to FIG. 14, after the single sheet of material has been refolded about a longitudinal fold to expose indicia on the back sides of the panels.
Figure 16:
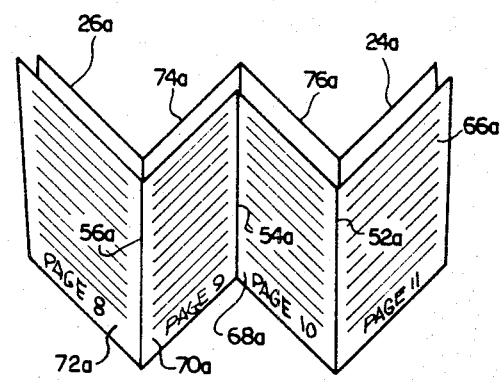
FIG. 16 is an illustration of the manner in which the single sheet of material of FIG. 15 is folded in a series of accordion or zig-zag folds.

The sheet is then unfolded and refolded about the longitudinal crease 44a so that the front sides of the panels 24a, 26a and 66a–76a are in abutting engagement. Thus, the sheet 34a is refolded in the manner indicated by the arrow 102 in FIG. 14. This results in the back sides of the panels 66a, 68a, 70a, and 72a being exposed in a right side up orientation as indicated in FIG. 15. The back sides of the panels 24a, 26a, 74a, and 76a, face rearwardly (as viewed in FIG. 15). The indicia on the back sides of the panels is in an upright orientation when viewed from the rear with the crease 44a downwardly. The publication is then refolded along the transverse creases 52a, 54a and 56a to form an accordion or zig-zag fold in the manner shown in FIG. 16. The folded publication can then be read by turning the panels in the manner previously explained in connection with the embodiment of the invention shown on FIGS. 1–11. This results in the viewer sequentially viewing pages 8–15 in the manner previously explained in connection with the embodiment of the invention shown in FIGS. 1–11.

THIRD EMBODIMENT OF THE INVENTION

Figure 17:
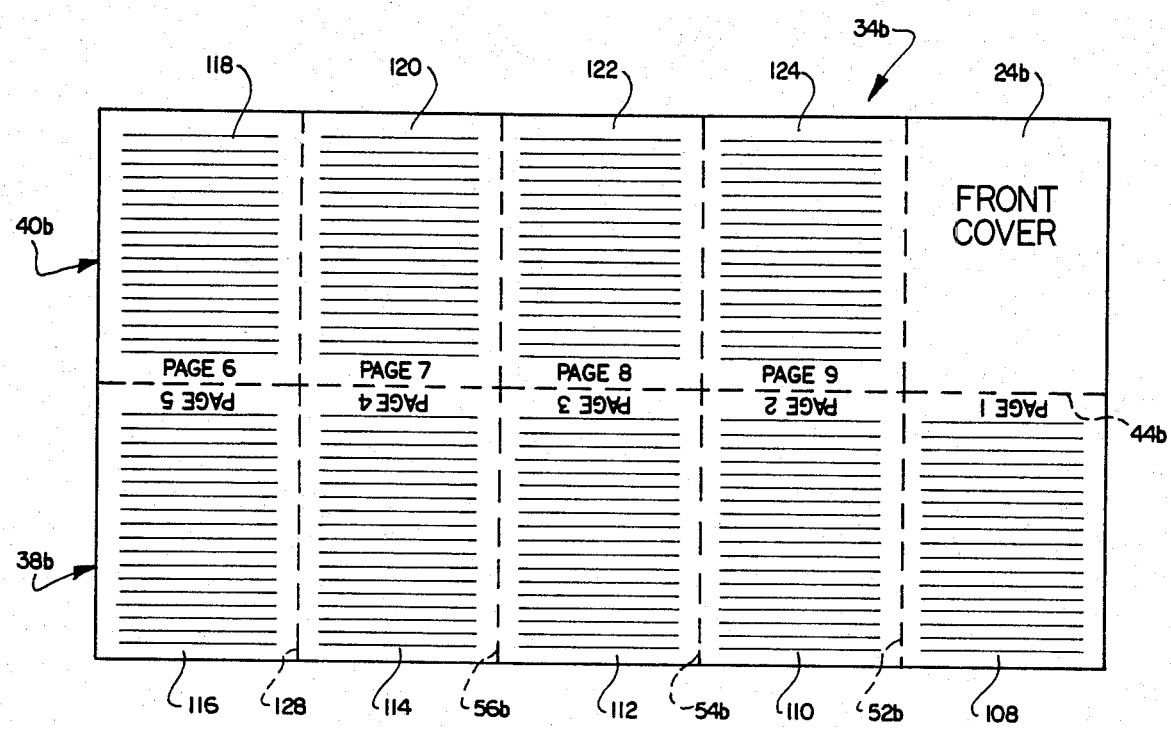
FIG. 17 is a top plan view, similar to FIG. 9, of a sheet of material for forming an embodiment of the invention having more panels than the embodiments of the invention illustrated in FIGS. 1-16.
Figure 18:
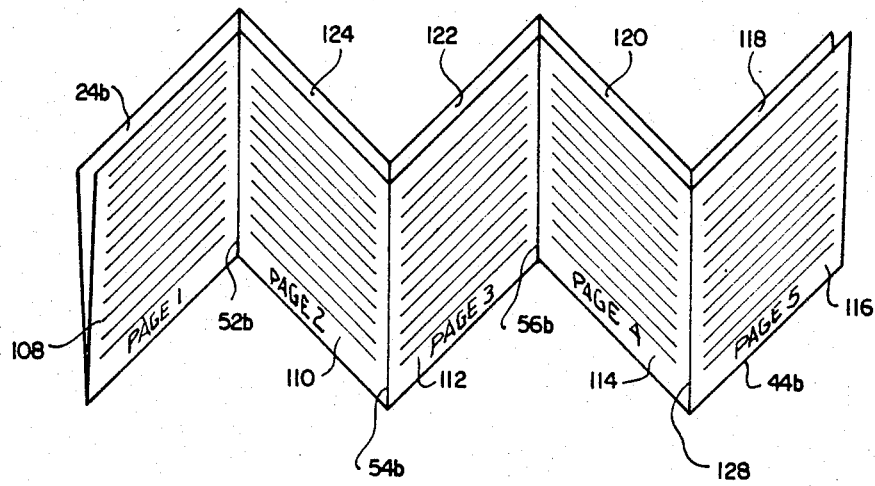
FIG. 18 is an illustration, generally similar to FIG. 2, illustrating the manner in which the single sheet of FIG. 17 is folded.

In the embodiments of the invention shown in FIGS. 1–11, a single flat sheet 34 has been provided with two series of panels 38 and 40 each of which contains an even number of panels, that is the series of panels 38 includes four panels designated 66, 68, 70 and 72, while the series 40 of panels includes the four panels designated 24, 26, 74 and 76. However, it is contemplated that the rectangular sheet could be formed with an odd number of panels in each series of panels. Thus, in the embodiment of the invention shown in FIGS. 17 and 18, a single sheet of material is divided into two series of panels, each of which contains five panels. Since the embodiment of the invention shown in FIGS. 17 and 18 is generally similar to the embodiment of the invention shown in FIGS. 1–11, similar numerals will be utilized to designate similar components, the suffix letter "b" being associated with FIGS. 17 and 18 to avoid confusion.

A publication, similar to the publication shown in FIG. 1, is formed from a single sheet 34b of material. The single sheet 34b of material has a first series of panels 38b and a second series of panels 40b. In accordance with a feature of this embodiment of the invention, each series 38b and 40b of panels contains an odd number of panels. Thus, the first series 38b of panels includes panels 108, 110, 112, 114 and 116 upon which indicia corresponding to pages 1–5 of the publication is printed. The second series of panels includes a front cover panel 24b and panels 118, 120, 122 and 124 upon which indicia for the cover and pages 6, 7, 8 and 9 is printed. The panels 24b and 108–124 are formed in the rectangular sheet 34b by a longitudinal crease 44b and a series of transverse creases 52b, 54b, 56b and 128. It should be noted that the indicia in the upper series of panels 40b is upright to a viewer while the indicia in the lower series of panels is offset by 180° relative to the viewer and is therefore upside down. The publication is formed by first folding the flat sheet 34b along the crease 44b so that the back sides (the downwardly facing sides as viewed in FIG. 17) of the panels are juxtaposed or are in a side-by-side relationship. The sheet 34b is then folded along the creases 52b, 54b, 56b and 128 to form a zig-zag or accordion folds in the manner shown in FIG. 18. The resulting publication can be read in the same manner as previously described in connection with the embodiment of the invention shown in FIGS. 1–11.

SUMMARY

The present invention provides a publication 20 which is formed from a single sheet 34 of material and is capable of being read in a manner similar to a magazine (FIGS. 4–8). In one embodiment of the invention, a poster or other illustration 30 is provided on the back of panels (FIG. 10) having front sides (FIG. 9) with indicia which is read when the panels are turned. In another embodiment of the invention (FIGS. 12–16) additional indicia is printed on the back of the panels so that the single sheet of material can be refolded and the additional indicia read.

Having described specific preferred embodiments of the invention, the following is claimed:

1. A publication capable of being read in a manner similar to a magazine, said publication comprising a single rectangular sheet of material having first and second major side surfaces with a pair of longitudinally extending edges and a pair of transversely extending edges, said sheet including a plurality of panels which are at least partially defined by a plurality of creases which are formed in said sheet and extend between opposite edges of said sheet, said plurality of creases including a longitudinal crease extending between the transverse edges of said sheet and a plurality of transverse creases extending between the longitudinal edges of said sheet, said plurality of creases cooperating to at least partially define a first series of rectangular panels extending along a first longitudinal edge of said sheet and a second series of rectangular panels extending along a second longitudinal edge of said sheet, each panel of said first and second series of panels having a first side formed by a portion of said first major side of said sheet and a second side formed by a portion of said second major side of said sheet, said panels of said first series of panels each having indicia disposed on the first sides of the panels in a first orientation relative to said sheet, said panels of said second series of panels each having indicia disposed on the first sides of the panels in a second orientation relative to said sheet, said first orientation of indicia being offset by 180° from said second orientation of indicia so that when said sheet is laying flat with the indicia on the first series of panels right side up relative to a viewer the indicia on the second series of panels is upside down relative to the viewer, said sheet being folded along said longitudinal crease to locate the second sides of said first series of panels in juxtaposition with the second sides of said second series of panels with the indicia on the first sides of said first series of panels facing in a first direction and disposed in a right side up orientation when viewed from the first direction and with the indicia on the first sides of said second series of panels facing in a second direction opposite from the first direction and disposed in a right side up orientation when viewed from the second direction, said sheet being folded at the transverse creases in a series of accordion folds with the first sides of said first series of panels in abutting engagement and with the second sides of said second series of panels in abutting engagement when the publication is in a closed condition with the panels disposed in a stack in which the first side of one of the panels in the second series of panels is at the top of the stack of panels to enable indicia on the first side of the one panel of the second series of panels to be viewed, said publication being openable to enable it to be read by turning said one panel of the second series of panels about a transverse crease disposed toward the left of the viewer in the same manner as in which the cover of a magazine is turned to open a magazine to thereby expose the first sides of a pair of panels in the first series of panels and then by sequentially turning the panels on the viewers right about center creases between pairs of exposed panels to sequentially expose the first sides of pairs of panels in the first series of panels until the panels are again stacked with a panel which was previously on the bottom of the stack of panels exposed to the viewer and with the first side of said one panel in the second series of panels at the bottom of the stack of panels, said stack of panels being openable from a closed condition in which the first side of said one panel in the second series of panels is at the bottom of the stack of panels by turning the top panel of the stack of panels about a transverse crease disposed toward the left of the viewer in the same manner as in which the cover of a magazine is turned to open a magazine to thereby expose the first sides of a pair of panels in the second series of panels and then turning panels on the viewers right about a center crease until the panels are stacked with the first side of said one panel in the second series of panels at the top of the stack of panels.

2. A publication as set forth in claim 1 wherein said second sides of said first and second series of panels have indicia thereon which form a pictorial illustration which extends across said second sides of each of the panels of said first and second series of panels.

3. A publication as set forth in claim 1 wherein said panels of said first and second series of panels each have indicia disposed on the second sides of said panels, said indicia on the second sides of said first series of panels having an orientation which is offset by 180° from said indicia on the second sides of said second series of panels so that the indicia on the second sides of said first series of panels is right side up relative to a viewer and the indicia on the second sides of said second series of panels is upside down relative to a viewer when said sheet is laying flat with the second sides of said panels facing the viewer, said sheet being foldable along said longitudinal crease to locate the first sides of said first series of panels in juxtaposition with the first sides of said second series of panels with the indicia on the second sides of said first series of panels facing in the first direction and disposed in a right side up orientation when viewed from the first direction and with the indicia on the second sides of said second series of panels facing in the second direction and disposed in a right side up orientation when viewed from the second direction, said sheet being foldable at the transverse creases in a series of accordion folds with the second sides of said first series of panels in abutting engagement and with the second sides of said second series of panels in abutting engagement when the publication is in a closed condition with the panels disposed in a stack, said publication being openable to enable it to be read by turning an uppermost panel on the stack of panels about a transverse crease disposed toward the left of the viewer in the same manner as in which the cover of a magazine is turned to thereby expose the second sides of a pair of panels and then sequentially turning the panels on the viewers right about center creases between pairs of exposed panels to sequentially expose the second sides of pairs of panels.

4. A publication as set forth in claim 1 wherein said first and second series of panels each include a pair of end panels and a plurality of intermediate panels disposed between the end panels, each of said intermediate panels being connected with a pair of adjacent panels in the same series of panels by a pair of transverse creases.

* * * * *